US008432898B2

(12) United States Patent
Samele et al.

(10) Patent No.: US 8,432,898 B2
(45) Date of Patent: Apr. 30, 2013

(54) END-TO-END TEST AND DIAGNOSTIC MANAGEMENT SYSTEM

(75) Inventors: Antonio Samele, Rome (IT); Gabriele Lupo, Rome (IT); Sirio Proietti, Rome (IT)

(73) Assignee: Accenture Global Services Limited, Dublin (IE)

( * ) Notice: Subject to any disclaimer, the term of this patent is extended or adjusted under 35 U.S.C. 154(b) by 1689 days.

(21) Appl. No.: 11/293,636

(22) Filed: Dec. 2, 2005

(65) Prior Publication Data

US 2007/0115860 A1    May 24, 2007

(30) Foreign Application Priority Data

Nov. 11, 2005  (EP) ..................................... 05425795
Nov. 11, 2005  (IT) .............................. MI2005A2166

(51) Int. Cl.
*H04L 12/66* (2006.01)
*H04M 1/24* (2006.01)
*H04M 3/08* (2006.01)
*H04M 3/22* (2006.01)

(52) U.S. Cl.
USPC ...... 370/352; 379/1.03; 379/9.02; 379/22.04; 379/27.05; 379/29.05

(58) Field of Classification Search .................. 370/352; 379/1.03, 9.02, 22.04, 27.05, 29.05, 352
See application file for complete search history.

(56) References Cited

U.S. PATENT DOCUMENTS

| | | | |
|---|---|---|---|
| 6,539,021 B1 * | 3/2003 | Kennelly et al. | 370/401 |
| 6,917,669 B1 * | 7/2005 | Jean et al. | 379/29.05 |
| 7,287,072 B1 * | 10/2007 | Dispensa et al. | 709/224 |
| 7,289,605 B1 * | 10/2007 | Jean et al. | 379/32.01 |
| 7,804,947 B2 * | 9/2010 | Brown et al. | 379/201.12 |
| 2002/0073062 A1 * | 6/2002 | Cerami et al. | 707/1 |
| 2004/0261116 A1 * | 12/2004 | Mckeown et al. | 725/109 |
| 2007/0041554 A1 * | 2/2007 | Newman et al. | 379/218.01 |

FOREIGN PATENT DOCUMENTS

| | | |
|---|---|---|
| JP | 06-164715 | 6/1994 |
| JP | 09-160849 | 6/1997 |
| WO | WO 00/72183 | 11/2000 |
| WO | WO 0072183 A2 * | 11/2000 |

OTHER PUBLICATIONS

European Search Report dated May 2, 2006 for corresponding Published European Appln. No. EP 1 786 141 A1.
Office Action in the Japan Patent Office dated Jul. 27, 2009, for corresponding Japanese Application No. 2006-332586.

* cited by examiner

*Primary Examiner* — Asad Nawaz
*Assistant Examiner* — Nicholas Jensen
(74) *Attorney, Agent, or Firm* — Brinks Hofer Gilson & Lione

(57) ABSTRACT

An end-to-end test and diagnostic manager and a method of diagnosing service problems in a multi-domain, multi-service network are provided. A database receives and stores service and network inventory data identifying and describing the customer and the network components necessary to deliver a service to the customer over a multi-domain network. An interface for displaying service information to an operator and for receiving commands from an operator is also provided. A plurality of test tools for testing operational status and verifying the configuration of components necessary to deliver the service to the customer. An application server is configured to execute instructions for invoking the test tools. The results of the test are displayed for the operator via the interface.

30 Claims, 7 Drawing Sheets

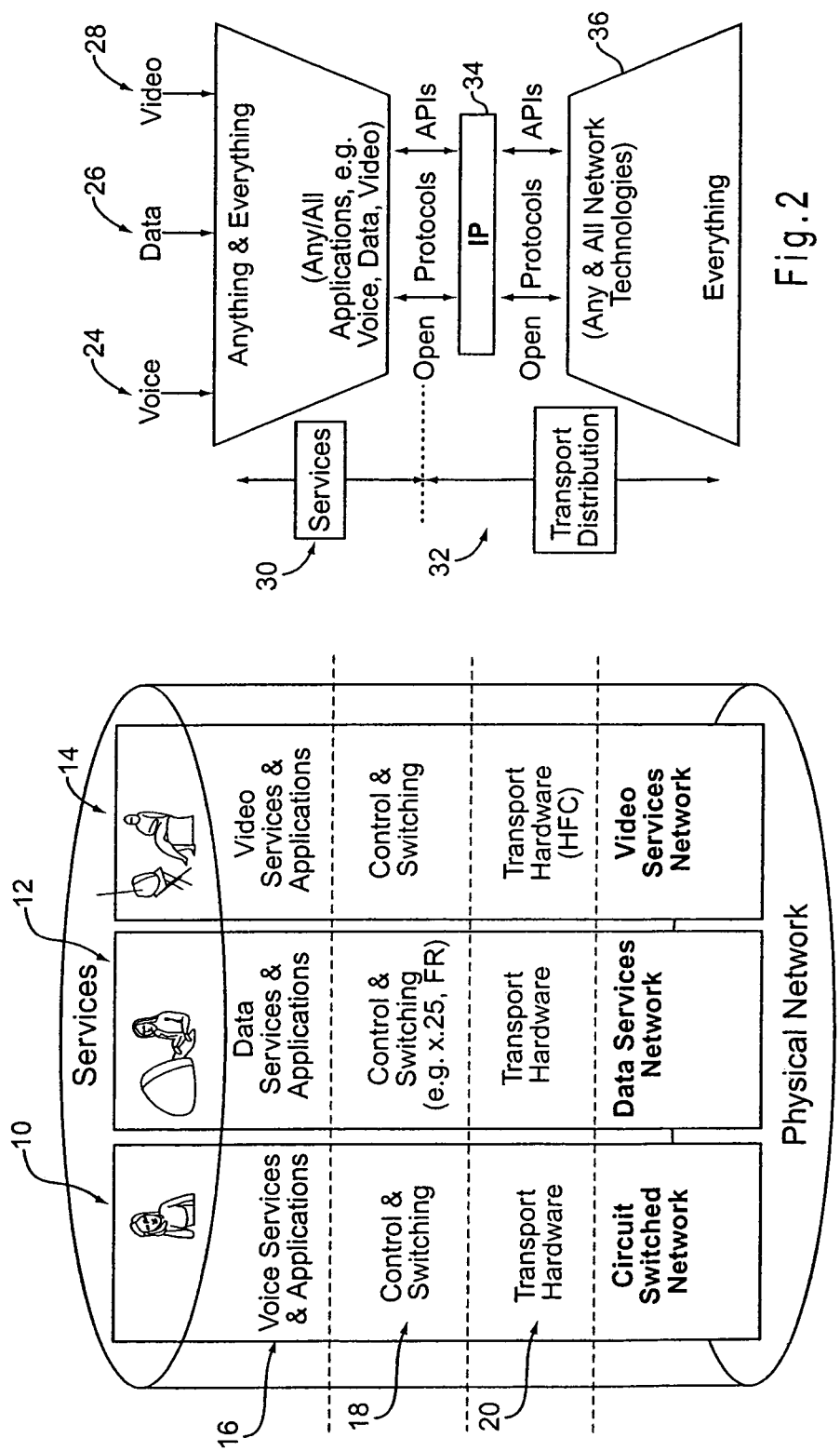

END-TO-END TEST AND DIAGNOSTIC MANAGEMENT SYSTEM

PRIORITY CLAIM

This application claims the priority benefit of EP Application No. 05425795.1, filed Nov. 11, 2005, now European Pat. No. 1786141, and Italian Application No. MI2005A002166, filed Nov. 11, 2005, now abandoned, both of which are incorporated herein by reference in their entirety.

BACKGROUND

The present invention relates to an end-to-end test and diagnostic manager for testing components and diagnosing service problems for services delivered via layered, multi-domain network environments.

In the past, various telecommunications services such as voice communication, data services, video services, and the like were delivered via stand-alone vertical networks. For example, FIG. 1 shows separate distinct networks for delivering voice communication services and applications 10, data services and applications 12, and video services and applications 14. Each separate network includes a service layer 16, control and switching layer 18, transport hardware layer 20, and a physical network layer 22. In each case the services are tightly coupled to the physical networks and network elements provided for distributing the services. For example, in a public switched telephone network (PSTN) the control and switching protocols and the physical switches themselves are all geared toward creating end-to-end circuits for providing point-to-point voice communication. Similar dedicated networks such as Ethernet, token ring, and the like having their own switching and control protocols and physical transport structures were developed for providing data transmission services. Video services, either broadcast or delivered via broadband cable, likewise developed their own set of control and switching protocols, transport hardware and networks. In each case, all aspects of the various integrated networks were configured specifically for the particular service the networks were designed to deliver.

Troubleshooting service problems in the vertically distributed proprietary networks of the past was a fairly straightforward proposition. The entire network was typically owned and controlled by a single entity having intimate knowledge of the end-to-end service delivery chain. This and the fact that the services were so tightly coupled to the network elements provided for delivering the services made it fairly simple to identify the components in the service delivery chain that might affect service delivery to a particular customer. Knowing the likely sources of service problems made it fairly simple to test the appropriate components and isolate the source of a problem.

Today the delivery of more and more telecommunications and broadcast services is converging on IP as the preferred transport layer. The convergence on IP decouples the services from the underlying access and transport networks. The result is a multi-service, multi-domain network where the services themselves are substantially independent of the physical transport layer. FIG. 2 illustrates the convergence on IP as the preferred transport layer. As opposed to the proprietary vertically integrated networks of the past, the new service model defines broad horizontal layers. Open protocols and APIs provide the operational interfaces between layers, with clear separation of access, transport, and services. Thus, the services layer 30 represents any and all services that can be delivered digitally over a network, including, but not limited to voice 24, data 26, and video 28. The transport and distribution layer 32 encompasses the IP layer 30 and the physical distribution layer 36. Through the use of open protocols and APIs all services can be packaged for transport via IP. The IP packaged data may be carried by virtually any and all physical network technologies.

The convergence on IP as the common transport layer for delivering multiple services to customers adds significant complexity to the service delivery chain. Today value added services (VAS) are based on complex network architectures and operational platforms. Portions of the service delivery chain may be, and likely are, outside the control of the service providers themselves. In these cases service providers must rely on networks and hardware provided and maintained by others to deliver their services. The decoupling of the services from the underlying access and transport system makes diagnosing and correcting service problems a much more difficult task than it was in the standalone service delivery platforms of the past.

To illustrate the complexity of today's service delivery platforms, consider the basic DSL service architecture 40 shown in FIG. 3. On the left, an Asymmetric Digital Subscriber Line (ADSL) 52, or a Symmetrical High-Speed Digital Subscriber Line (SHDL) 54 provides a digital connection to a customer's home or business. The DSL connection provides access to the broader IP network or internet via a Network Application Server (NAS) 42. The customer's DSL line (ADSL or SHDL) connects to a first, local DSL access multiplexer (DSLAM) 50. The local DSLAM 50 serves a limited number of customers in a small geographical region. The local DSLAM 50 connects to a remote DSLAM 48 which serves a plurality of local DSLAMS. The remote DSLAM 48 connects to an ATM network 45 via a first BPX switch 46. The NAS 42 connects to a second BPX switch 44 elsewhere in the ATM network 45. There are likely additional BPX switches in the ATM network 45. However, from the point of view of delivering internet access to the customer at the end of the ADSL line 52 via NAS 42, BPX switches 44 and 46 serve as the entry and exit points to the ATM network 45 and any other BPX switches within the ATM network are not relevant to the service delivery chain. The DSL technology is currently evolving introducing the possibility to deliver current and new services through different infrastructures using IP DSLAMs connected through Ethernet interface to GBE (Gigabit Ethernet) or MANs (Metropolitan Area Network).

The service delivery chain becomes more complicated when the Customer Premises Equipment (CPE) is taken into account. The DSL service depicted in FIG. 3 requires at minimum a DSL modem at the customer's premises. Local area networks, WI-FL Routers, and other CPE can further complicate the service delivery picture. FIG. 4 shows a not atypical customer premises arrangement 60. ADSL Line 62 enters the customer's premises via a network interface device 64. A splitter 66 separates voice and data, connecting the voice signal to a standard telephone set 72 via a first wall jack 68 and connecting data signal to a DSL modem 74 via a second wall jack 70. A local area network hub 76 connects a plurality of computers 78, 80, 82 to the DSL modem 74. Thus each computer has access to the DSL line via the LAN. In addition to the network components described with regard to FIG. 3, the DSL modem 74 and the LAN HUB 76 must also be operating and configured properly in order for users at computers 78, 80, 82 to received services over the DSL line 62. Thus, if these components are not operating properly or are not configured properly, the CPE domain can provide another source of service problems.

The service delivery chain becomes even more complicated with the increased complexity of the services delivered. For example, FIG. 5 shows a typical architecture for voice over network (VoN) service. Tracking down a service problem for an individual customer in this environment can be a very complicated task. As can be seen, the VoN service requires the interaction of multiple network domains, including multiple network elements and service components. Furthermore, the service is provided to multiple customers, at different location, having different connections and having different CPE.

The VoN architecture 100 is divided between the VoN or service layer 102, the transport layer 104, and the CPE layer 106. Starting with the CPE layer 106, a number of different client configurations are shown. The different client configurations will depend mainly on the type of access to the transport layer, the available bandwidth, and other factors.

Client 108 includes a local area network 114, one or more VoN telephone devices 116, and a plurality of user computers 118. A Customer Edge 120 interfaces with a Provider Edge in the transport layer 104, providing access to a virtual private network (VPN) 140. VPN 140 is based on multi-protocol label switching (MPLS). The VPN 140 accesses the broader IP network via NAS 154.

The Client arrangement 110 includes a local area network 126 and a plurality of VoN telephone devices 122. A Customer Edge 124 provides the interface to an IP Edge Network 142. The IP Edge Network 142 provides access to the broader IP network 148.

Client 112 includes a plurality of traditional telephone devices 128, an Access Gateway, and a Customer Edge 132. The Access Gateway 130 and the Customer Edge 132 interface with DSLAM 158 via a digital subscriber line.

Also shown in the customer layer 106 are a traditional PBX 134 and a traditional telephone device 136. In the system shown, the PBX 134 and the traditional telephone device 136 may participate in telephone calls with customers employing the VoN service. However, the PBX 134 and telephone device 136 operate on a traditional public switched telephone network 146 and are not themselves amenable to VoN service.

The transport layer 104 includes the VPN 140, the IP Edge network 142, the ADSL network 144, the PSTN 146, the IP network 148, and a backbone network transit level 150 for traditional voice service, as well as the interface components therebetween. For example, the VPN 140 interfaces with the IP network 148 via NAS, 154. The ADSL network interfaces with the IP network 148 via NAS 156. The PSTN interfaces with the backbone network of backbone transit level (BB-TL) 150. The IP network interfaces with the BB-TL network via a media gateway (MG) 162.

The VoN service layer 102 includes a user profile database 172, Packet IN application server 174 that includes service logic and user profile data, one or more SIP Servers and Softswitches 166 for interfacing with the PSTN 146 via the BB-TL 150.

In this example, the service delivery chain includes all of the network elements involved in delivering VoN service to the end customer. For example, to deliver VoN service to customer 112 the service delivery chain includes the Sip Server and Softswitch 170, the switch 166, the media gateway 162, the NAS 156, DSLAM 158, and the Access Gateway 130. Additional components within the various network domains such as ATM switches, IP routers, and the like may also comprise part of the service delivery chain. All of these elements must be operating and configured properly to provide VoN service to the customer 112. Of course different networks and different network elements will be part of the service delivery chain delivering VoN service to other customers. Identifying all of the network elements involved in delivering service to a particular customer is a significant task in troubleshooting service delivery problems. Performing tests on all the various equipment comprising service delivery chain and checking configuration data across all of the service delivery domains has been well nigh impossible.

To date there has been no system or procedure for providing comprehensive end-to-end test and diagnostics of services delivered via the IP transport layer with a structured, end-to-end approach. The lack of such systems and procedures adds significantly to the time, effort and expense of troubleshooting service delivery problems.

BRIEF SUMMARY OF THE INVENTION

The present invention relates to an end-to-end test and diagnostic manager for troubleshooting service problems for services delivered via layered multi-domain service delivery networks across diverse technology platforms. In particular, an embodiment of the invention provides an end-to-end test and diagnostic manager for services delivered using Internet Protocol (IP) as the common transport layer. The end-to-end test and diagnostic manager provides a comprehensive solution for troubleshooting services, such as VoN, IP-TV, video on demand, unified messaging, and the like delivered via the IP transport layer.

According to an embodiment, an end-to-end test and diagnostic manager comprises a software application that allows front-end operators (e.g., call center customer service representatives) and back-end operators (e.g., more skilled operators available to troubleshoot more complex service problems that cannot be resolved by front-end operators) to troubleshoot the entire service chain extending from the service provider, across multiple network domains, to the end customer. The end-to-end test and diagnostic manager provides a customer-centric end-to-end operational view of services, focusing more on managing services as opposed to managing the underlying transport mechanisms or networks.

An embodiment of the invention provides a system for troubleshooting service problems for services delivered over multi-domain service delivery networks. A plurality of test tools for testing operational status and configuration of network elements in the various domains involved is provided. A test and diagnostic manager has access to network and service inventory data. In response to a service interruption or other customer complaint, the test and diagnostic manager accesses the network and service inventory data to learn which services are delivered to the customer and identify the network elements necessary to deliver the services to the customer. The test and diagnostic manager then selectively invokes the various test tools to determine the operational status and configuration of selected network elements. A graphical user interface displays the results of the selectively invoked tests so that an operator may determine the source of a service problem and take steps to resolve it.

In another embodiment an end-to-end test and diagnostic manager includes a graphical user interface for displaying status and configuration data regarding networks, network components, and services to, and receiving commands from an operator. An application server has access to network and service inventory data. Upon receiving a report of a service problem, the application server determines the networks and network components necessary to deliver the service to the customer. The application server is adapted to execute workflows to selectively invoke one or more test tools to determine the operational status or configuration of the network elements involved in delivering the service. The results may be displayed by the graphical user interface so that an operator may determine the source of the problem and take steps to resolve it.

Finally, a method of diagnosing service delivery problems in services delivered over multi-domain service delivery networks is provided. The method includes gathering a set of information of a service problem interviewing a customer. Upon receiving the report of a problem using a customer billing number, it is possible to gather information regarding all network elements necessary to deliver the service to the customer. Once all of the network elements in the service delivery chain are known, remotely testing the network elements to determine if they are operating properly and are configured correctly to identify the cause of the problem. Once the source of the problem is determined, taking steps to resolve it. Finally, when the problem is resolved, performing a remote end-to-end test to ensure the service has been restored.

Alternatively, the diagnostic process may be driven by report of network device problem. Upon receiving the report of a network problem it may be possible to select a specific network resource (network element or application component), and gather information about the status of the specific network resource in order to understand if it is operating properly and configured correctly.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 1 is an illustration showing dedicating vertically integrated service delivery networks.

FIG. 2 is an illustration showing the convergence on IP as the preferred service delivery transport layer;

DETAILED DESCRIPTION OF THE DRAWINGS AND THE PRESENTLY PREFERRED EMBODIMENTS

Diagnosing service delivery problems in a multi-domain service delivery environment requires accessing and relating information from diverse sources and presenting the resulting data in a structured and consolidated manner to allow operators viewing the data to quickly identify the nature and cause of service delivery problems and allow them to take immediate corrective actions to resolve the problems.

Figure 6:
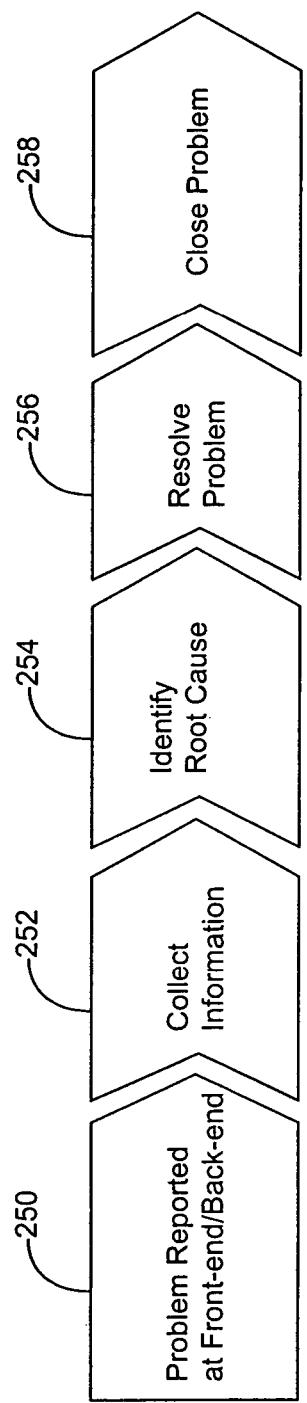
FIG. 6 is a flow chart showing the steps involved in trouble shouting a service delivery problem.

FIG. 6 shows an overview of the steps necessary to identify and resolve service delivery problems. First, a problem is reported at 250. Information about the problem is collected at 252. The collected information may include information about the customer experiencing the problem, such as the services the customer subscribes to, and the service or services affected by the problem, the service delivery equipment on the customer's premises, and the networks and network elements that comprise the service delivery chain for providing the service to the customer. The collected information may also include information about the service that is experiencing a problem. Additional collected data may include alarm repositories, existing related trouble tickets, planned engineering/maintenance activities, performance management reports, predictive systems reports and the like.

The root cause of the service delivery problem is identified at 254. This may involve analyzing the network and service inventory, performing intrusive/non-intrusive tests on network elements, analyzing historical test results, and the like. Once the root cause of the problem has been identified steps may be taken to resolve the problem at 256. This may involve dispatching support personnel to repair customer premises equipment or other hardware, accessing network element managers and test systems, modifying configuration data, and the like. Finally once the problem has been resolved the problem may be closed at 258. Closing the problem may include performing a final end-to-end verification test, archiving test results, and so forth.

Figure 7:
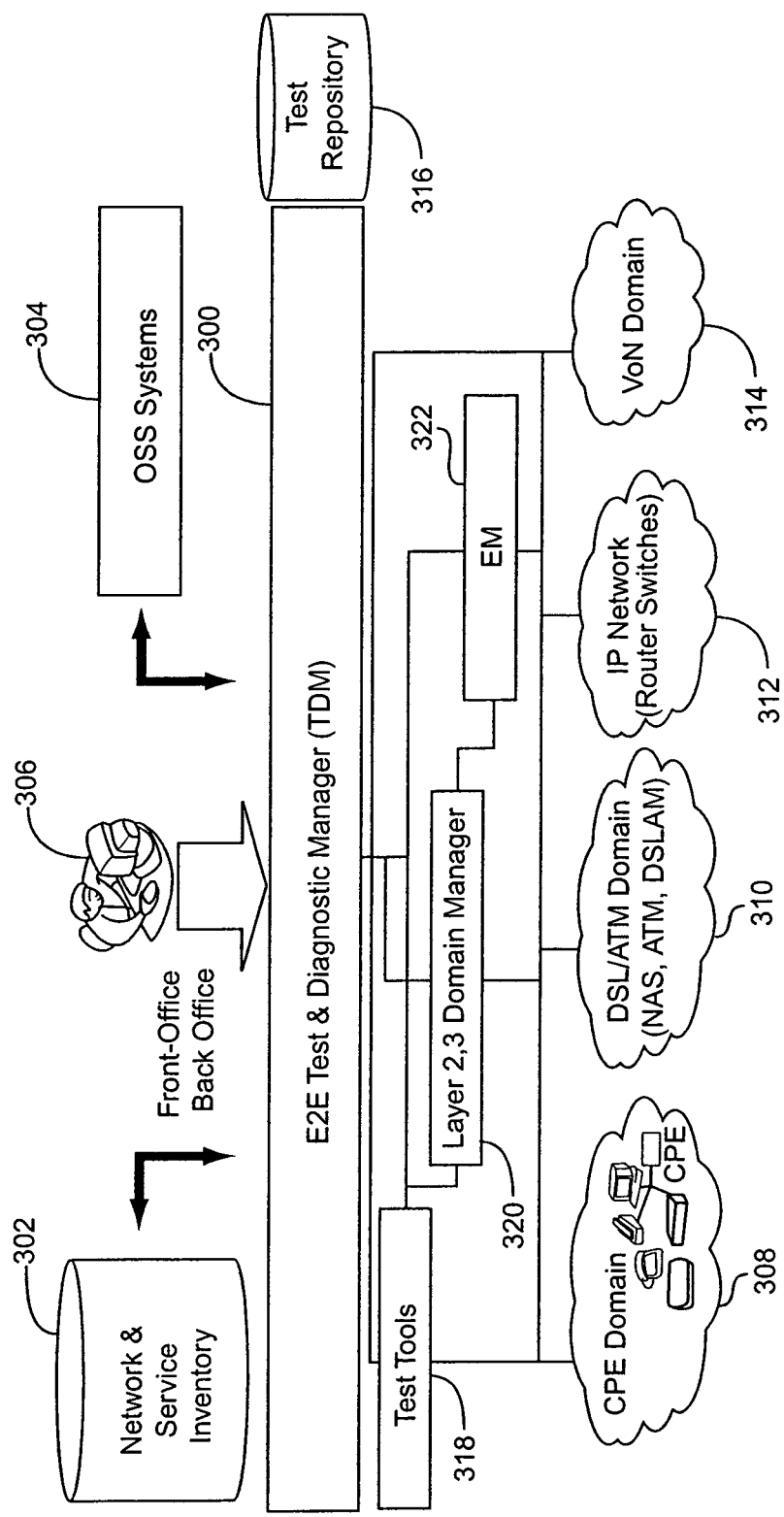
FIG. 7 is a simplified block diagram of an end-to-end test and diagnostic manager.

A simplified view of an end-to-end test and diagnostic manager 300 and the environment in which it operates is shown in FIG. 7. The end-to-end test and diagnostic manager 300 has access to network and service inventory data 302 and other operating support systems (OSS) 304. The end-to-end test and diagnostic manager 300 may pull data from the network and service inventory 302 and OSS 304 as needed in order to develop a comprehensive picture of the service delivery chain including the network platforms, systems and components necessary to deliver a particular service to a specific customer.

According to an embodiment, the network and service inventory data are stored in an Oracle database or some other commercially available database, and may be accessed via SQL queries. The information exchanges between the network and service inventory and the end-to-end test and diagnostic manager includes "commercial information" and "technical information." The commercial information relates to customers, their service provider, their service plan, service ID, service dates, and the like. The technical information gathered from the network and service inventory includes all of the information necessary to rebuild the circuit for delivering services to a customer in order prepare an accurate representation of the circuit, and to allow the end-to-end test and diagnostic manager to query all the major devices involved. The technical information must include information on all services that a customer subscribes to and all of the components necessary to deliver those services.

According to an embodiment, three separate database tables are accessed to obtain all of the technical relevant data. The key input parameter is the customer ID (Billing Number) or some other reliable identifier. The first table accessed is the A-Z Circuit Table which identifies all of the major components required to build the circuit from the service provider to the customer for delivering a particular service to a particular customer. In this table the point "A" is represented by the DSLAM and the point "Z" is represented by the NAS. The necessary components include, among others, the point "A" of the ATM domain (the ATM access device facing the service provider) and the point "Z" of the ATM domain (the ATM access device facing the customer). A sample A-Z circuit table is shown in Table 1. The A-Z circuit table includes a plurality of attributes that define the types of components necessary to build the circuit for delivering a service to a customer. Corresponding values identify the real world components that fill these roles. The customer ID value (Billing Number) identifies the customer for whom the service delivery chain is being constructed. The DSLAM name identifies the DSLAM that serves the identified customer. The next several attributes relate to connection and configuration data for the identified DSLAM, identifying ports, subscriber lines, etc. for delivering services to the identified customer. The NAS name identifies a network applications server that provides the service to the customer via the ATM network serving the customer. The identified NAS provides access to and allows services to be delivered through the IP domain. The remaining attributes relate to connection and configuration data for the NAS.

TABLE 1

(A&Z Circuit)

| Attribute Name | Value |
| --- | --- |
| Customer ID | 0065940342 |
| DSLAM Name | MILANUSER/DSL/005 |
| Port Customer side (ATU-C) | ADSL 2-2-12-19 |
| DSL Line | 2:2:12 |
| Port Customer side (ATU-C) | ADSL 2-2-12-19 |
| VCI | 2-2-12-19:8.35 |
| Cross Connection | LT = 8.35/NT = 34.65 |
| Port ATM Side | MRL08C |
| VCI | 34.65 |
| NAS Name | AT-BO256 |
| Port ATM Side | ATM4:3:7 |
| VCI | 23.65 |

The "Port ATM Side" value from the DSLAM portion of Table 1 is used to query a second database table (that represent the logical link between the MUX and the ATM domain) in order to determine the point "A" of the ATM domain network. This query identifies the appropriate ATM device, the proper port on the ATM and so forth. These data are used to identify, in the IP table, the corresponding IP address and then check the operational status and configuration of the ATM device and the designated port. An example of the second database table (MUX Logical Link) is shown in Table 2.

TABLE 2

(MUX Logical Link)

| Attribute Name | Value |
| --- | --- |
| ATM Device Name | MGX9063 |
| Port | MGX 9063:3:5 |
| VPI | MGX 9063:3:5:34 |

The "Port ATM Side" value of the NAS portion of Table 1 is then used to perform a similar query of a third database table to learn which device represents the point "Z" at the opposite end (from the service deliver standpoint) of the ATM domain. Again, this query identifies the appropriate ATM device, the proper port, and so forth, so that the operational status and configuration of the ATM device and the designated port can be verified. An example of the third table (NAS Logical Link) is shown in Table 3.

TABLE 3

(NAS Logical Link)

| Attribute Name | Value |
| --- | --- |
| ATM Device Name | MGX9064 |
| Port ATM Side | MGX 9064:5:5 |
| VPI | MGX 9064:5:5:27 |

The last step is to determine the IP addresses of the devices identified above, namely the DSLAM, the "A" and "Z" ATM devices, the NAS, and any other relevant devices that may be necessary to deliver a particular service to the identified customer. This is accomplished through a separate query of a fourth database table (IP Address Device). An example of an IP Address Device Table is show in Table 4.

TABLE 4

IP Address Device Table

| Attribute Name | Value | IP Address |
| --- | --- | --- |
| DSLAM Name | MILANUSER/DSL/005 | 10.11.134.178 |
| ATM Device Name | MGX9063 | 10.11.156.170 |
| NAS Name | AT-BO256 | 10.11.124.138 |

Figure 3:
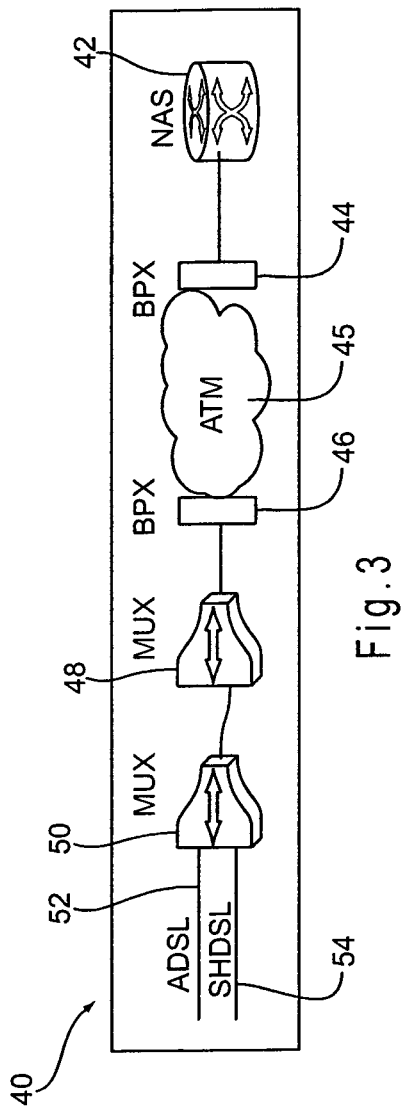
FIG. 3 is a block diagram of a DSL network.
Figure 4:
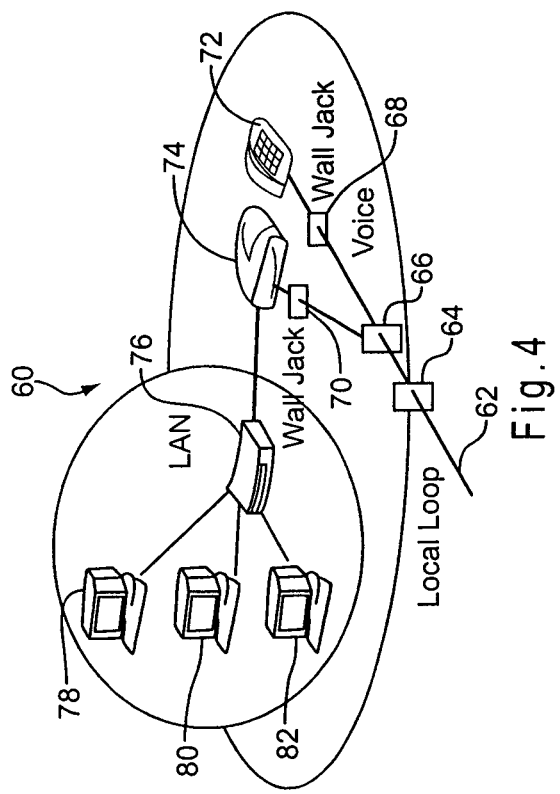
FIG. 4 is a block diagram showing typical customer premises equipment.
Figure 5:
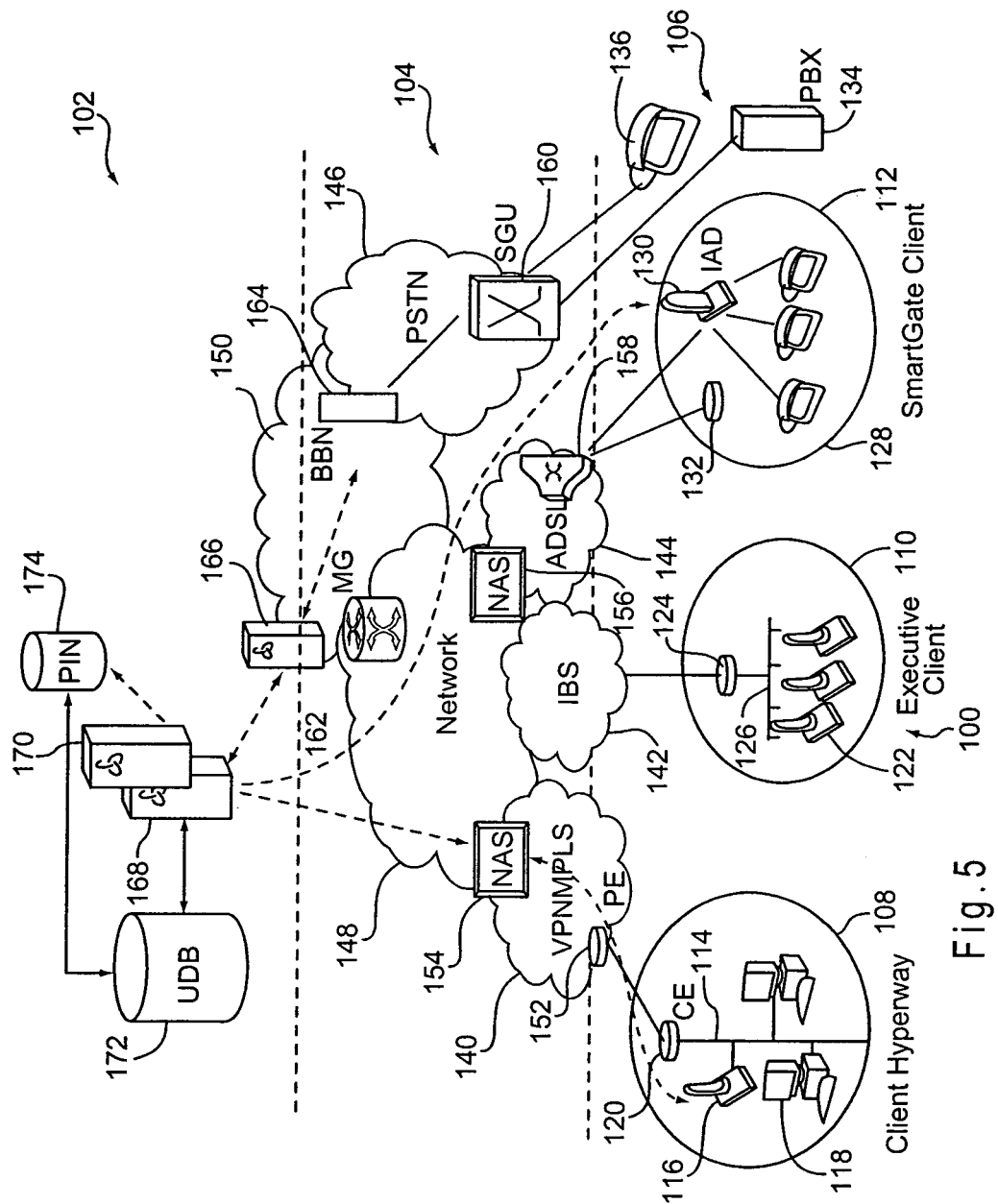
FIG. 5 is a diagram showing a typical voice over network (VoN) architecture.

Commercial information is obtained by querying yet another table. Again, the customer ID (billing number) is the primary key. A sample commercial information tale is shown in FIG. 5.

TABLE 5

(Commercial Information)

| Attribute Name | Value |
| --- | --- |
| Customer ID | 0065940342 |
| Customer Name | Kate Moss |
| ISP | AOL |
| PLAN | VoN Fast Access |
| Service ID | 986241585 |
| Plan Start Date | Jul. 13, 1977 |

Technical information and commercial information may also be pulled from the other operational support systems 304. For example, the IP address of the device at the customer's premises may be obtained from the service delivery platform (SDP) 338. The IP address may be used, for example, to determine whether the customer premises equipment is up and running using a simple "Ping IP" test. Other information may also be pulled from the SDP 338. The information exchange between the SDP and the end-to-end test and diagnostic manager may be accomplished by web services. Parameters from the SDP may include:
Technical Key (TK) that is the real identifier of the circuit; it's composed by:
(Name NAS, card, port, VPI, VCI)=(AT-BO256, 3, 7, 23, 65)
Management Session:
date of first connection, last connection=(Nov. 7, 2005 22:34; Nov. 7, 2005 23:18)
Data Session:
date of first connection, last connection=(Nov. 7, 2005 22:35; Nov. 7, 2005 23:17)
Master Account:
user name and date of creation=(sirio.baldini@aol.us, Aug. 15, 2005)

Data Service:
Plan, Commercial offering=(VoN Fast Access, VoN-3numbers)
Added Services:
State of Parental Control, State of Captive Portal=(off, off).
IP Address:
IP Address of the management session (10.10.148.170)

Once all of the component links of the service delivery chain have been identified, an operator 306 employing the end-to-end test and diagnostic manager 300 may invoke test procedures for testing various aspects of the service delivery process. For example, the operator may initiate tests analyzing the status of hardware components and network elements that make up the service delivery chain in order to identify the root causes of service delivery problems.

According to an embodiment, the end-to-end test and diagnostic manager 300 has access to a full compliment of test tools for testing all of the functional domains involved in delivering the service to the customer. The various functional domains may include the CPE domain 308, the DSL/ATM domain 310, the IP network domain 312 and the VoN (or service) domain 314.

Examples of the diagnostic tools that may be available include:
- CPEMS Ping Test: this is a simple ping test to verify that all of the Customer Premises Equipment (all the devices at the customer premises) may be reached by the end to end test and diagnostic manager.
- Sync Profile: this is a tool that gathers the configuration parameters (attenuation, noise margin, etc.) of the customer on the DSLAM.
- Port verification: this tool checks the operational status of the DSLAM port to which the customer device is connected).
- Port Lock/Unlock: this is a system wide administrative command that shuts down the port on a targeted device (DSLAM, ATM, IP router, . . . ) and restart it.
- No Sync Test: this test returns a Boolean result about the synchronization between the modem and the DSLAM (Siemens, Alcatel, .etc.) and the customer device (Modem or CPE).
- Port Reset: this test is used to reset the configuration on the DSLAM (Client side port).
- IP Ping Testing: this test is used to verify the reachability of the IP devices (NAS: Cisco 10k, Cisco 6004, Juniper ERX, etc.).
- Test Call: this test simulates an IP call through the element manager of a switch to customer telephone but does not cause the customer phone to ring.
- Call History: this is a tool that provides information (date of first and last call, the duration, the time, etc.) about IP calls made by the customer.
- End-To-End VoN Service: this is a tool that checks and reports information about the IP calls (band, quality of communication, inbound/outbound etc.).
- End-To-End BB Service: this is a tool that gathers information about packets sent, lost, and received for specific NEs.
- MLT (Mechanized Loop Testing) these are a set of tools used to determine the condition of a customer's PSTN line:
  - testing that the line is OK;
  - a potential problem with customer's equipment, such as defective telephone or receiver off hook;
  - speech on the line.

The end-to-end test and diagnostic manager 300 may be configured to access and invoke the various tests in a number of different ways. For example, the end-to-end test and diagnostic manager may include a test repository 316 that includes workflows that define the steps to be taken to test the operational status and configuration of the various components in different domains. The workflows defined in the test repository may include steps for interrogating and testing hardware devices and network elements directly. Alternatively, the workflows may invoke external test tools and commercial packages 318 developed to test specific components in the various domains. In yet another alternative, the end-to-end test and diagnostic manager 300 may invoke a Layer 2, 3 Domain Manager 320 to test the functionality of one or more domains. Finally, the end-to-end test and diagnostic manager 300 may invoke Element Managers (EM) 322 configured to test various components within the various domains. The workflows within the test repository 316 may be fairly complex. Depending on whether internal/external test tools available, whether or not a Layer 2, 3 Domain Manager is present or if any Element Managers are available, the end-to-end test and diagnostic manager may invoke tests and interrogate components in a combination of different ways. For example, the end-to-end test and diagnostic manager may test some components directly via APIs executed on an API server within the end-to-end test and diagnostic manager. Other tests may be invoked through external test tools, others through the Layer, 2, 3 Domain Manager 320, and still others through separate Element Managers 322.

The end-to-end test and diagnostic manager 300 presents a graphical user interface (GUI) to front-end and back-end operators 306. Front-end operators may use the end-to-end test and diagnostic manager to assess service complaints and run simple initial diagnostic tests in order to determine whether a service delivery problem may be resolved quickly by standard, easily performed procedures, or whether more sophisticated analysis is necessary to resolve the problem. If so, back-end operators may use the system to perform more sophisticated tests and delve deeper into more trouble some service problems. The various tools that are available to front-end and back-end operators may be defined in a user profile database. Back-end operators may be given access to more sophisticated tests and diagnostic tools than their front-end counterparts. For example, the interface may further provide back-end operators access to historic test results, alarm and fault logs, maintenance and service schedules, performance management systems, predictive systems, and the like, in order to assist back-end operators in determining the cause of difficult service delivery problems. The end-to-end test and diagnostic manager interface may further provide back-end operators with means for taking steps to resolve service problems that are not available to front-end operators, such as dispatching appropriate support teams, accessing Element Managers and configuration management systems, and the like. Once problems are resolved back-end operators can perform verification of service tests and archive the various test results and the actions taken to resolve the problems.

Figure 8:
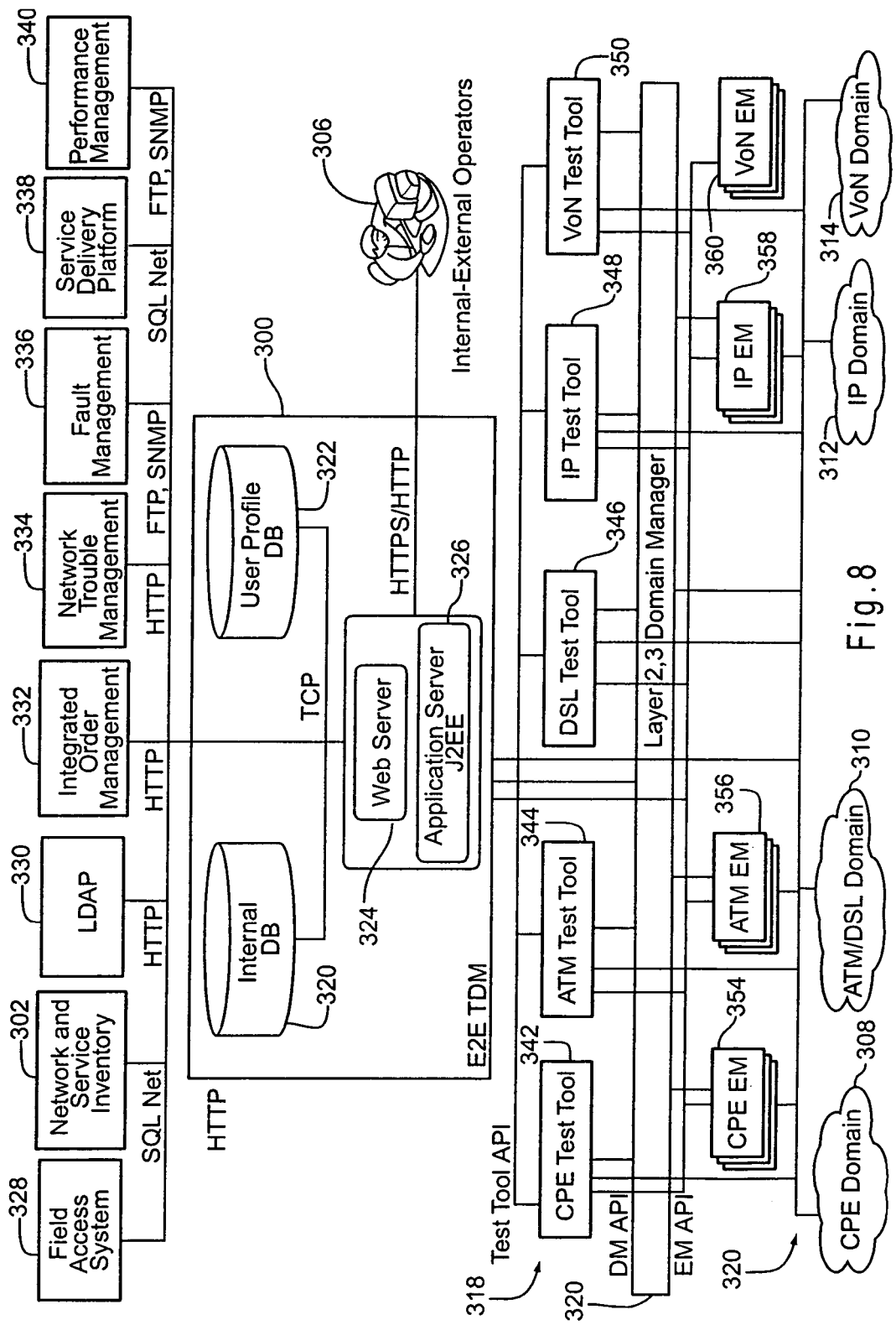
FIG. 8 is a more detailed block diagram of an end-to-end test and diagnostic manager and the service delivery environment.

FIG. 8 shows a more detailed view of an end-to-end test and diagnostic manager 300 and the surrounding multi-domain service delivery environment. Many of the components described in FIG. 7 have been repeated in FIG. 8 and have been given like reference numbers. As shown, the end-to-end test and diagnostic system 300 interfaces with network and service inventory 302, and other operations support systems (OSS) 304. The OSS 304 may include a field access system 328, an LDAP 330, an integrated order management system 332, a network trouble management system 334, a fault management system 336, a service delivery platform 338, and a performance management system 340.

The end-to-end test and diagnostic manager 300 has three possible types of interaction with other OSS systems 304 and network resources.

1) The end-to-end test and diagnostic manager can pull information from:
   Network and service inventory 302 that provide data related to:
   services offered by the service provider;
   service provider's customers;
   services provided to specific customers;
   network components involved in delivering particular services to particular customers.
   Service delivery platform 338 (service and user profile information).
   Specific tools 318, Domain Manager 320, EM 322 and network elements.
   Performance management 340 in order to check about a degradation in the devices involved in the service provided to the customer.
   The integrated order management 332 to gather information about the status of the work request concerning the claiming customer.
2) The end-to-end test and diagnostic manager provides information to:
   Network trouble management 334 in order to manage the customer trouble related to service problems on the network and to gain an enrichment of the related trouble ticket.
   Fault management 336 in order to open an alarm when a problem is found and to provide information about impacted customers.
   The field access system 328 to perform a final check of the service restoration accessing the test manager from the mobile terminal of the technicians at the customer house.
3) The end-to-end test and diagnostic can also perform an information exchange with LDAP (Lightweight Directory Access Protocol) server in order to authorize user accesses.

A plurality of external test tools 318 is shown in FIG. 8, including a CPE test tool 342, an ATM test tool 344, a DSL test tool 346, an IP test tool 348, and a VoN test tool 350. Similarly, a plurality of element managers 322 is also shown. The element managers 322 include CPE element managers 354, ATM element managers 356, IP element manager 358, and VoN element managers 360. Multiple element managers are shown for each domain since each domain may include multiple network elements types. The Layer 2, 3 Domain Manager 320 is also shown in FIG. 8. It should be noted that in various end-to-end test diagnostic manager implementations not all of the test tools, Element Managers or the layer 2, 3 Domain Manager will necessarily be present. In most cases various combinations of the test tools, element managers and the Layer 2, 3 Domain Manager will be combined together with additional direct access test protocols within the end-to-end test and diagnostic manager 300. Preferably, the end-to-end test and diagnostic manager 300 the test tools 318, the Layer 2, 3 Domain Manager and the Network Element managers 322 that are present in a particular embodiment will combine to provide a full compliment of diagnostic tests for performing a comprehensive analysis of the service chain for of all services offered by a service provider.

The end-to-end test and diagnostic manager 300 itself includes an internal database 320, a user profile database 322, a web server 324, and an application server 326. The user profile database 322 stores the user profiles of the front-end and back-end operators and other administrative personnel having access to the end-to-end test and diagnostic manager 300 for troubleshooting service problems. The user profiles will include the access rights and privileges of the various users, defining the test and diagnostic tools and configuration data available to the different types of users.

The internal database 320 stores data relating to customers and the services delivered to them. According to an embodiment, the internal database 320 does not store a comprehensive data set of all customers, services and service delivery components. Rather, the internal database 320 pulls the necessary data from the network and service inventory 302 and other OSS 304 as needed to resolve specific service delivery problems. The data are then stored in the internal database 320 where they are accessed by the web server 324 to populate the various data fields and displays of the GUI, or by the application server 326 to execute the various workflows necessary to perform an end-to-end test of the services delivered to the particular customer who lodged the complaint.

Figure 9:
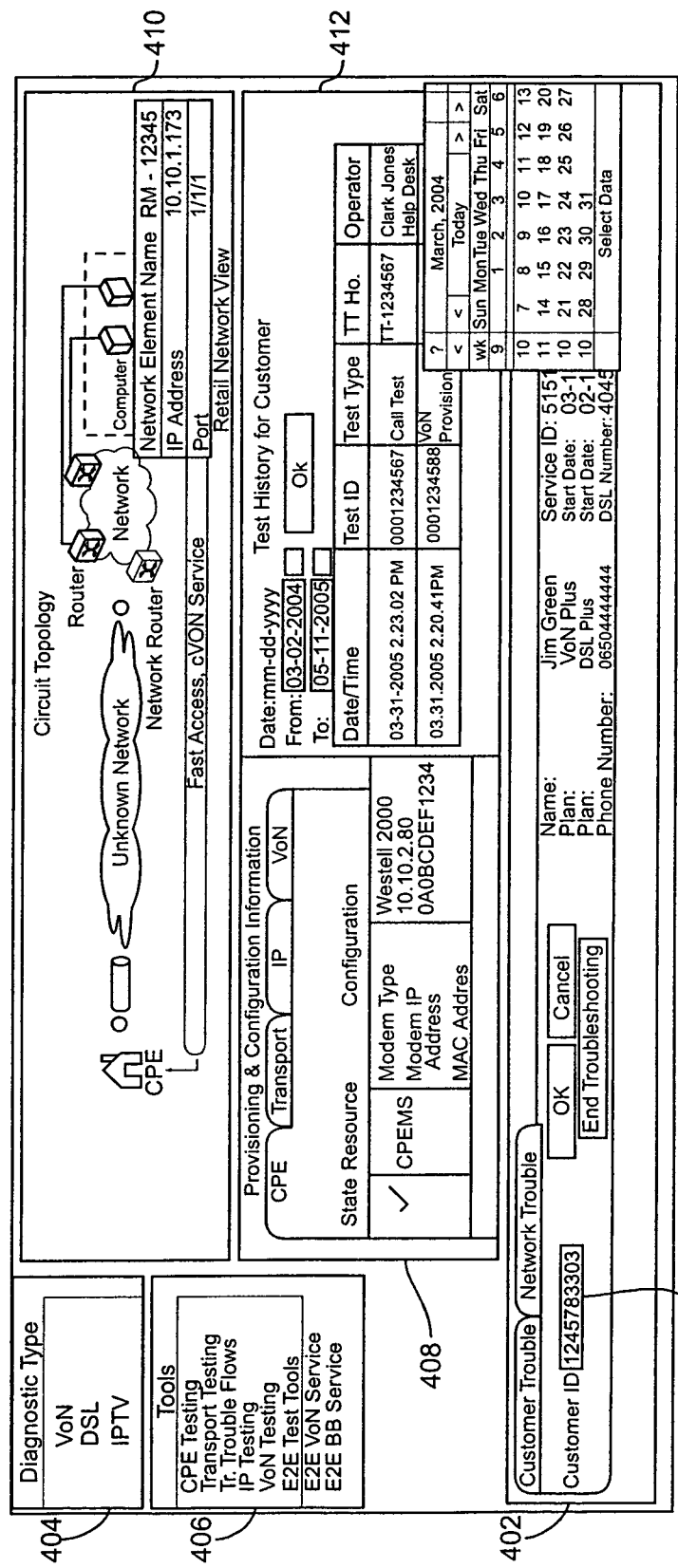
FIG. 9 is an illustration of an end-to-end test and diagnostic manager GUI page.

FIG. 9 shows an example of an end-to-end test and diagnostic manager graphical user interface (GUI) page 400. The GUI page 400 includes a number of distinct areas where different types of information are displayed, and where different actions may be initiated by an operator interacting with the interface. These include a customer display area 402; a diagnostic type area 404; a tools area 406; a provisioning and configuration information area 408; a network display area 410; and a customer test history area 412.

According to an embodiment, the customer billing number serves as the customer ID and drives the end-to-end test and diagnostic manager. Accordingly, when a customer calls to report a service interruption or some other service delivery problem, an operator enters the customer's billing number into the customer ID field 414 in the customer display area 402. Upon receiving the customer ID, the application server 326, pulls the relevant data relating to the customer and the services subscribed to by the customer from the network and service inventory 302 and other OSS 304. The pulled data are stored in the internal database 320, and are used to populate the pages of the GUI served to the operator by web server 324. Thus, in the example shown in FIG. 9, the operator has entered a customer ID 124578909 in the customer ID field 414. Information regarding the customer and the services the customer subscribes to are displayed in the customer display area 402. In this case, the customer is Jim Green. He subscribes to VoN Plus service, and DSL Plus service. Additional data such as the customer's phone number; service ID number, plan start dates, DSL ID number; and the like may also be displayed. The operator can select a customer trouble or network trouble view in the trouble view area 402. The selection of the network trouble view allows the operator to perform a diagnosis by network resources (network elements or application components involved in the service) using the identifier of network resource or selecting the specific application component. In cases of a large area wide service interruption, this may be the most efficient method of locating the source of a problem.

The diagnostic type area 404 lists the types of services that the end-to-end test and diagnostic manager is configured to diagnose. The diagnostic type area may list all of the services offered by the service provider, or the displayed list may be limited to the particular services the identified customer subscribes to. In either case, the operator may select the appropriate diagnostic type from the diagnostic type area 404 based on the nature of the customer's complaint. In the example shown, the operator has selected the customer's VoN service to be diagnosed.

The tools area 406 displays the test and diagnostic tools available to troubleshoot the various services. The tools displayed in the tools area 406 may be limited to the tools applicable to the service selected in the diagnostic type area 404, or the full compliment of available tools may be displayed. In either case, the operator selects the various tools for testing components and diagnosing service delivery problems from the tools area 406.

The network display area 400 shows a simplified view of the service delivery chain. The data regarding the service delivery chain are pulled from the network and service inventory 302, and include all the network elements involved in delivering the selected service to the customer. The simplified graphical representation of the service delivery network helps the front-end operator to easily understand where problems lie, and to dispatch them to the appropriate service departments. For example, the numbingly complex VoN service delivery architecture shown in FIG. 5 is reduced down to the simplified network shown in the network display area 410 of GUI page 400. Although simplified, the network displayed in FIG. 9 nonetheless includes all critical components necessary for delivering VoN service to the identified customer Jim Green.

The provisioning and configuration area 408 displays equipment and equipment configuration data for various domains of the service deliver chain. For example, the provisioning and configuration information area 408 includes tabs for displaying provisioning and configuration data for the CPE domain, the transport domain, the IP domain and the VoN domain. In the example shown the CPE tab is selected, and the provisioning and configuration information area 408 displays information about the customers in-home modem including the modem type, IP address and MAC address.

Finally, the customer test history area 412 displays data relating to previous tests that have been performed for the selected customer to troubleshoot earlier problems. The operator may enter a date range in the "From" and "To" fields 416, 418 and the customer test history area 412 will display information regarding all tests performed for that customer during the designated period. The information includes the test date, the test ID, the test type, a trouble ticket number associated with the test, and the operator who instituted the test. The test history may provide insight into current service delivery problems.

The information displayed on the GUI page 400 provides a complete end-to-end view of the service delivery chain for delivering the various services to the customer. The GUI further displays the various tests and diagnostic tools that are available to the operator for troubleshooting service delivery problems.

Returning to FIG. 8, the application server 326 includes workflows that are executed when some tests and diagnostic tools are invoked. For example, when a specific test is to be performed on a specific network element, the application server determines whether the test is to be performed by a network Element Manager, a separate stand along test tool, a Layer 2, 3 Domain Manager, or by the application server itself. In cases where the test must be performed by the application server 326 itself, the application server accesses the appropriate device directly and executes the commands necessary to perform the selected test. The application server receives the test results and stores them in the database 320 where they may be accessed by the web server to be presented to the operator via the GUI. Otherwise, the application server sends instructions to the appropriate test tool, the Layer 2, 3 Domain Manager, or the appropriate network Element Manager, according to the workflows, and invokes the desired test. The test tool, Layer 2, 3 Domain Manager or the network Element Manager, as the case may be, accesses the appropriate network element and performs the required test. In either case, the test results are returned to the application server, and incorporated into the GUI pages served to the operator via the web server 324. Since the application server has access to all network elements in the service delivery chain, either directly or through the intermediary test tools layer 2, 3 domain manager or network element managers, the end-to-end test and diagnostic manager can provide complete end to end coverage of the service delivery chain. A workflow can also define the sequence of elementary test tools to be executed in order to perform a more complex diagnosis. The single test results are used by the test manager as a trigger to follow a specific workflow.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system for troubleshooting a service delivery problem of a service delivered to a customer over a multi-domain network wherein the multi-domain network includes a service delivery chain of network components for delivering the service, the system comprising:

a server configured to:
  receive a report of the service delivery problem;
  obtain customer profile information associated with the customer and operator profile information associated with a first system operator and with a second system operator;
  responsively retrieve data from a network and service inventory database and store the retrieved data in a database, wherein the retrieved data specifies the service delivery chain of network components that deliver the service;
  determine a first and a second set of applicable test and diagnostic tools from among a set of available tools for troubleshooting the network components of the service delivery chain, wherein the first set of applicable test and diagnostic tools are determined from among the set of available tools based on the customer profile information and the operator profile information associated with the first system operator and the second set of applicable test and diagnostic tools, which are different from the first set of applicable test and diagnostic tools, are determined from among the set of available tools based on the customer profile information and the operator profile information associated with the second system operator; and
  execute workflows for invoking selected test and diagnostic tools of the first or second set of applicable diagnostic tools; and
a graphical user interface (GUI) in communication with the database and configured to:
  display the service delivery chain of network components in a network display area of the GUI; and
  display, in a tools area of the GUI, at least one of the first set of applicable test and diagnostic tools to the first system operator and the second set of applicable test and diagnostic tools to the second operator;
wherein the server is further configured to:
  obtain input from the first system operator specifying a first selected test and diagnostic tool from among the first set of applicable test and diagnostic tools and the workflows to invoke the first selected test and diagnostic tool; and obtain input from the second system operator specifying a selected test and diagnostic tool from among the second set of applicable test and diagnostic tools.

2. The system of claim 1 wherein the data includes a service plan subscribed to by the customer.

3. The system of claim 1 wherein the data includes customer data describing service equipment at a customer's premises and under the customer's control.

4. The system of claim 1 wherein the data includes information retrieved by the server from an operations support system.

5. The system of claim 1 further comprising a mobile terminal having a field access system, wherein the server is further configures to obtain data from the field access system and perform a final check of service restoration.

6. The system of claim 1 wherein the server is further configured to pull data from an LDAP (Lightweight Directory Access Protocol) to perform an information exchange to authorize user accesses.

7. The system of claim 1 wherein the server is further configured to pull data from an integrated order management system to gather information about the status of a work request concerning the service delivery problem.

8. The system of claim 1 wherein the server is further configured to provide information to a network trouble management system.

9. The system of claim 1 wherein the server is further configured to pull data from a fault management system to open an alarm when a problem is found and to provide information about impacted customers.

10. The system of claim 1 wherein the server is further configured to pull data from a service delivery platform to gather service and user profile information.

11. The system of claim 1 wherein the server is further configured to pull data from a performance management system to check for degradation in the network components.

12. The system of claim 1 wherein the server is further configured to provide data gathered from a selectively invoked diagnostic tool to an external operations support system.

13. The system of claim 1 wherein the test and diagnostic tools include a stand alone test tool package.

14. The system of claim 1 wherein capabilities of said tools are provided by network element managers having access to specific network elements' configuration data and which are capable of testing the specific network elements' operational status.

15. The system of claim 1 wherein capabilities of said plurality of test tools are provided by a layer 2, 3, domain manager.

16. The system of claim 1 wherein capabilities of said test tools are included as test modules stored in the database.

17. The system of claim 1 wherein said plurality of test tools comprise a combination of stand alone test tool packages, network element managers, a layer 2, 3 manager, and a test module stored in the database.

18. The system of claim 1 further comprising a user profile database that stores the operator profile information, the operator profile information comprising access privileges associated with the first and second system operators.

19. The system of claim 1 further comprising a web server for serving a GUI page.

20. The system of claim 1, further comprising:
a test repository database configured to store the workflows, wherein the server is further configured to access the test repository database after obtaining the system operator input.

21. An end-to-end test and diagnostic manager diagnose a service delivery problem of a service delivered by way of a service delivery chain of network components to a customer over a multi-domain network, the end-to-end test and diagnostic manager comprising:
a graphical user interface (GUI) for displaying status and configuration data of the network components that comprise the service delivery chain, and applicable test tools available to troubleshoot the service delivery problem, whereby a user may select one or more of the applicable test tools; and
a server configured to:
receive a report of the service delivery problem and responsively retrieve network and service inventory data;
obtain a customer profile information associated with the customer, a first user profile information associated with a first user and second user profile information associated with a second user;
determine, based on the report, network and service inventory data, and customer and first and second user profile information:
network services provided to the customer, the network components, and the status and configuration data; and
the applicable test tools identified from among a set of available tools for troubleshooting the network components of the service delivery chain, the applicable test tools comprising a first set of applicable test tools selected by the first user from among the set of available tools and a second set of applicable test tools selected by the second user from among the set of available tools; and
execute workflows to invoke at least one of the test tools selected by the first user or the second user.

22. The end-to-end test and diagnostic manager of claim 21 wherein the test tools comprise any combination of tools taken from the list comprising: Customer Premises Equipment Ping Test; Sync Profile; Port verification; Port Lock/Unlock; No Sync Test; Port Reset; Internet Protocol (IP) Ping Testing; Test Call; Call History; End-To-End Voice over Network (VoN) Service; and End-To-End Backbone (BB) Service; and Mechanized Loop Testing (MLT).

23. The end-to-end test and diagnostic manager of claim 21 wherein the server is further configured to execute one or more of the test tools directly.

24. The end-to-end test and diagnostic manager of claim 21 wherein the server is further configured to invoke an external test tool to test network elements within a domain of the multi-domain network.

25. The end-to-end test and diagnostic manager of claim 21 wherein the server invokes at least one of the test tools via a layer 2,3 domain manager.

26. The end-to-end test and diagnostic manager of claim 21 wherein the server invokes at least one of the test tools via an element manager associated with a network.

27. The end-to-end test and diagnostic manager of claim 21 further comprising a web server, the graphical user interface comprising a web based graphical user interface having interface pages served to a client terminal associated with an operator.

28. The end-to-end test and diagnostic manager of claim 27 further comprising a user profile database for storing user profiles defining access rights test privileges of operators permitted to use the end-to-end test and diagnostic manager.

29. The end-to-end test and diagnostic manager of claim 21 wherein the server is configured to invoke a plurality of test tools to test the status of every network component involved in delivering the service.

30. A method for diagnosing a service delivery problem of a service delivered by way of a service delivery chain of network components to a customer over a multi-domain network, the method comprising:

receiving a report of the service delivery problem;

obtaining, using a computer processor, a customer profile information associated with the customer, a first operator profile information associated with a first system operator and a second operator profile information associated with a second system operator;

constructing, using the computer processor, the service delivery chain of network components;

determining, using a computer processor and based on the report and the customer and the first and second operator profile information, a first and a second set of applicable test tools from among a set of available tools for troubleshooting the network components of the service delivery chain;

displaying on a graphical user interface:
   the service delivery chain of network components;
   the first set of applicable test tools to the first system operator; and
   the second set of applicable test tools to the second system operator;

obtaining second system operator input identifying selected test tools from among the displayed second set of applicable test tool;

obtaining first system operator input identifying selected test tools from among the displayed first set of applicable test tool; and identifying a root cause of the service delivery problem by executing workflows to invoke at least one of the selected test tools.

* * * * *

UNITED STATES PATENT AND TRADEMARK OFFICE
CERTIFICATE OF CORRECTION

PATENT NO. : 8,432,898 B2  
APPLICATION NO. : 11/293636  
DATED : April 30, 2013  
INVENTOR(S) : Antonio Samele et al.

Page 1 of 1

It is certified that error appears in the above-identified patent and that said Letters Patent is hereby corrected as shown below:

<u>In the Specification</u>

In column 9, line 17, after "access to a full" replace "compliment" with --complement--.

In column 10, line 37, after "into more" replace "trouble some" with --troublesome--.

In column 11, line 59, after "provide a full" replace "compliment" with --complement--.

In column 13, line 3, after "or the full" replace "compliment" with --complement--.

<u>In the Claims</u>

In column 14, claim 1, line 61, after "to the second" insert --system--.

In column 15, claim 5, line 14, after "further" replace "configures" with --configured--.

In column 15, claim 13, line 42, after "include a" replace "stand alone" with --stand-alone--.

In column 15, claim 17, line 54, after "a combination of" replace "stand alone" with --stand-alone--.

In column 18, claim 30, line 9, after "test" replace "tool" with --tools--.

In column 18, claim 30, line 12, after "test" replace "tool" with --tools--.

Signed and Sealed this  
Eighth Day of October, 2013

Teresa Stanek Rea  
*Deputy Director of the United States Patent and Trademark Office*